US012792817B2

(12) United States Patent
Wang et al.

(10) Patent No.: US 12,792,817 B2
(45) Date of Patent: Nov. 10, 2026

(54) USER MEDALS HOMEPAGE WITH VARYING DISPLAY MODES ACCORDING TO A NUMBER OF USER MEDALS EARNED BY THE USER

(71) Applicant: Beijing Zitiao Network Technology Co., Ltd., Beijing (CN)

(72) Inventors: Yiguo Wang, Beijing (CN); Huabin Tian, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 316 days.

(21) Appl. No.: 18/574,648

(22) PCT Filed: Oct. 24, 2022

(86) PCT No.: PCT/CN2022/126944
§ 371 (c)(1),
(2) Date: Dec. 27, 2023

(87) PCT Pub. No.: WO2023/071970
PCT Pub. Date: May 4, 2023

(65) Prior Publication Data

US 2024/0143895 A1 May 2, 2024

(30) Foreign Application Priority Data

Oct. 26, 2021 (CN) ........................ 202111250309.2

(51) Int. Cl.
*G06F 3/0483* (2013.01)
*G06F 40/10* (2020.01)

(52) U.S. Cl.
CPC ............ *G06F 40/10* (2020.01); *G06F 3/0483* (2013.01)

(58) Field of Classification Search
None
See application file for complete search history.

(56) References Cited

U.S. PATENT DOCUMENTS 10,325,277 B1 * 6/2019 Ballepu .............. G06Q 30/0226
2008/0091689 A1 * 4/2008 Mansikkaniemi .......................... G01C 21/3682
2011/0161852 A1 * 6/2011 Vainio .................. G06F 3/0488 715/810
2013/0238392 A1 * 9/2013 Sloan ................ G06Q 30/0201 705/7.29

(Continued)

FOREIGN PATENT DOCUMENTS

CN 101241413 A 8/2008
CN 103810188 A 5/2014

(Continued)

*Primary Examiner* — Gabriel Mercado
(74) *Attorney, Agent, or Firm* — Astute IP Law Group

(57) ABSTRACT

A medal display method, a medal display device, an electronic device, a storage medium, and a computer program product are provided. The medal display method includes: determining a number M of medals granted to the first user; determining a display mode according to the number of medals, in which different numbers of medals correspond to different display modes; and displaying medal information of the first user on a personal homepage of the first user according to the display mode that is determined.

19 Claims, 7 Drawing Sheets

(56) References Cited

U.S. PATENT DOCUMENTS

| | | | | |
|---|---|---|---|---|
| 2014/0156308 | A1* | 6/2014 | Ohnemus | G16H 15/00 705/3 |
| 2016/0224195 | A1* | 8/2016 | Okabe | G06F 3/0482 |
| 2017/0139474 | A1* | 5/2017 | Rochford | G06F 3/017 |
| 2018/0188903 | A1* | 7/2018 | Sirpal | G06F 3/04847 |
| 2021/0256808 | A1* | 8/2021 | Palmisano | G06Q 30/0209 |
| 2021/0342528 | A1* | 11/2021 | Kapcar | G06F 40/186 |
| 2022/0218271 | A1* | 7/2022 | Belding | A61B 5/447 |

FOREIGN PATENT DOCUMENTS

| | | | |
|---|---|---|---|
| CN | 303792994 | S | 2/2016 |
| CN | 305154736 | S | 10/2018 |
| CN | 111680231 | A | 9/2020 |
| CN | 112860148 | A | 5/2021 |
| CN | 113126851 | A | 7/2021 |
| CN | 113452932 | A | 9/2021 |
| CN | 113900759 | A | 1/2022 |

* cited by examiner

USER MEDALS HOMEPAGE WITH VARYING DISPLAY MODES ACCORDING TO A NUMBER OF USER MEDALS EARNED BY THE USER

CROSS REFERENCE TO RELATED APPLICATIONS

This is a national stage application based on International Patent Application No. PCT/CN2022/126944, filed Oct. 24, 2022, which claims priority ofto Chinese patent application No. 202111250309.2 titled "MEDAL DISPLAY METHOD AND APPARATUS, AND DEVICE" filed on Oct. 26, 2021 in China National Intellectual Property Administration, the disclosures of which are incorporated herein by reference in their entireties .

TECHNICAL FIELD

The present application relates to the technical field of computers, and specifically, to a medal display method, apparatus, and device.

BACKGROUND

In enterprises or group organizations, in order to facilitate the communication between employees, under usual circumstances every enterprise is configured with enterprise collaborative work software, and a user can carry out real-time communication and cooperation among two or more people through a client on which the collaborative work software is installed. The collaborative work software refers to a suite of software that integrates any number of functions of address book, instant messaging tool, conference, cloud document, examination and approval, cloud disk, mail, calendar, etc.

In order to motivate employees, enterprises can motivate employees to work better by means of granting electronic medals to employees. How to grant and display electronic medals to employees through collaborative work software is an urgent technical problem to be solved.

SUMMARY

In view of this, the embodiments of the present application provide a medal display method, device and device, so as to realize adjustment of display mode according to number of medals and make display effect more harmonious and aesthetical.

In order to achieve the above purpose, the technical schemes provided by the embodiments of the present application are as follows.

In the first aspect of the embodiments of the present application, there is provide a medal display method, which may include:

- determining a number M of medals granted to the first user;
- determining a display mode according to the number of medals, in which different numbers of medals correspond to different display modes;
- displaying medal information of the first user on a personal homepage of the first user according to the determined display mode.

In the second aspect of the embodiments of the present application, there is provided a medal display device, which may include the first determination unit, the second determination unit, and the display unit.

The first determination unit is used for determining a number M of medals granted to the first user.

The second determination unit is used for determining a display mode according to the number of medals, in which different numbers of medals correspond to different display modes.

The display unit is used for displaying medal information of the first user on a personal homepage of the first user according to the determined display mode.

In the third aspect of that embodiments of the present application, there is provided an electronic device comprising a processor and a memory;

- the memory is used for storing instructions or computer programs;
- the processor is used for executing the instructions or computer programs in the memory to cause the electronic device to perform the described medal display method.

In the fourth aspect of the embodiments of the present application, there is provided a computer-readable storage medium having stored instructions which, when executed on a device, cause the device to perform the medal display method described in the first aspect.

In a fifth aspect of the embodiments of the present application, there is provided a computer program product, in which the computer program product, when executed on a device, causes the device to perform the medal display method described in the first aspect.

Therefore, the embodiments of the present application bring about the following beneficial effects:

In the embodiments of the present application, the number M of medals obtained by the first user is firstly determined when displaying the medals obtained by the first user; then a corresponding display mode is determined according to the number M of medals, that is, different display modes are determined according to different numbers of medals; after the display mode is determined, medal information of the first user is displayed on a personal homepage of the first user according to the display mode. It can be seen that, through the scheme provided by the embodiments of the present application, the display manner of medals on the personal homepage can be adjusted according to the number of medals, so that the display effect can be more stable, harmonious, and aesthetical, improving the user experience.

DETAILED DESCRIPTION

In order to make the above objectives, features and advantages of the present application more obvious and easy to understand, the embodiments of the present application will be further illustrated in detail in conjunction with the accompanying drawings and specific embodiments.

In practical application, in order to motivate employees, enterprises want to grant electronic medals to employees through collaborative work software to motivate employees to work better. How to display granted electronic medals to employees is an urgent technical problem to be solved.

Considering that the numbers of medals obtained by different users are different, in order to guarantee the display effect of the medals with different numbers, the embodiments of the present application provide a medal display method, which will adjust display mode of medals on personal homepage according to different numbers of medals, thereby guaranteeing the stability, harmony and aesthetics of the display effect of the medals on the personal homepage and improving the user experience.

In order to facilitate the understanding of the technical scheme provided by the embodiments of the present application, the technical scheme provided by the embodiments of the present application will be illustrated in conjunction with the accompanying drawings.

Figure 1:
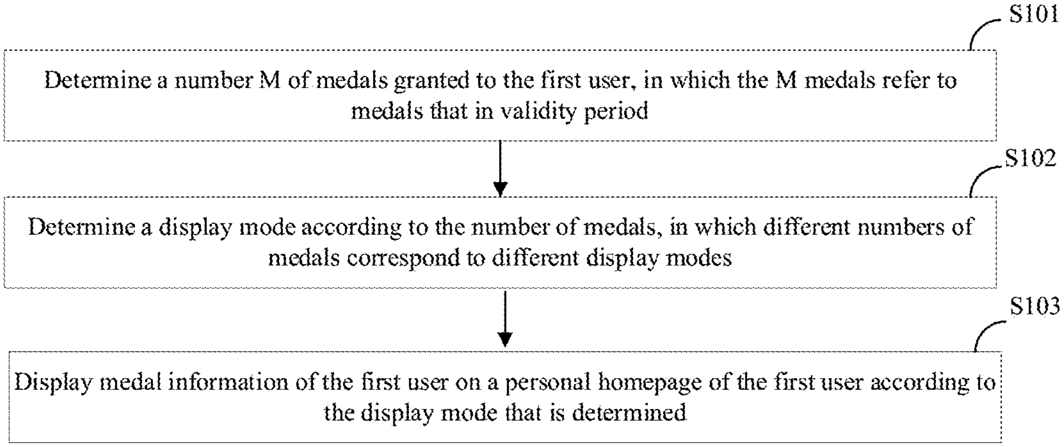
FIG. 1 is a flowchart of a medal display method provided by an embodiment of the present application.

Referring to FIG. 1, which is a flowchart of a medal display method provided by an embodiment of the present application. As illustrated in FIG. 1, the method includes:

S101: determining the number M of medals granted to the first user.

In this embodiment, an enterprise can issue medals to the first user through collaborative work software. In order to realize a function for adjusting the display mode of the medals on the personal homepage according to different numbers of medals, the collaborative work software will firstly determine the number M of medals granted to the first user. M is a natural number.

It should be noted that, under usual circumstances, a granted medal has its corresponding validity period, during which the medal belongs to the user, and beyond which the medal does not belong to the user. Therefore, in this embodiment, the M medals granted to the first user refer to medals that are still in the validity period. Meanwhile, the medals displayed on the personal homepage are those that are in the validity period.

S102: determining a display mode according to the number of medals, in which different numbers of medals correspond to different display modes.

After the number M of medals granted to the first user is determined, the display mode will be determined according to the number M of medals. A correspondence between the different numbers of medals and the display modes may be preset. The display mode may be determined according to the number M of medals of the first user and the correspondence.

In a specific implementation, the display mode is determined as the first display mode in response to M being greater than the first preset threshold. The first display mode is used to indicate that the medal information displayed on the personal homepage includes the first preset threshold number of medals and a remaining number, and the remaining number refers to a number obtained by subtracting the first preset threshold from the number M of medals, so that the user can intuitively learn a total number of the obtained medals. The first preset threshold number of medals displayed on the personal homepage may be determined according to the actual situation. For example, the first preset threshold number of medals may be set by the first user himself/herself. Alternatively, it is predefined to display the first preset threshold number of medals that were granted recently, or to display the first preset threshold number of medals that are going to expire soon. The first preset threshold may be set according to the actual application situation. For example, in the case where the first preset threshold is 3 and the number M of the medals obtained by the first user is 6, then the recently granted 3 medals will be displayed on the personal homepage of the first user, and a numerical value 3 is displayed. Specifically, the personal homepage includes a medal wall entrance component, on which the medal information of the first user may be displayed, including icons of the first preset threshold number of medals and a remaining number.

Figure 2A:
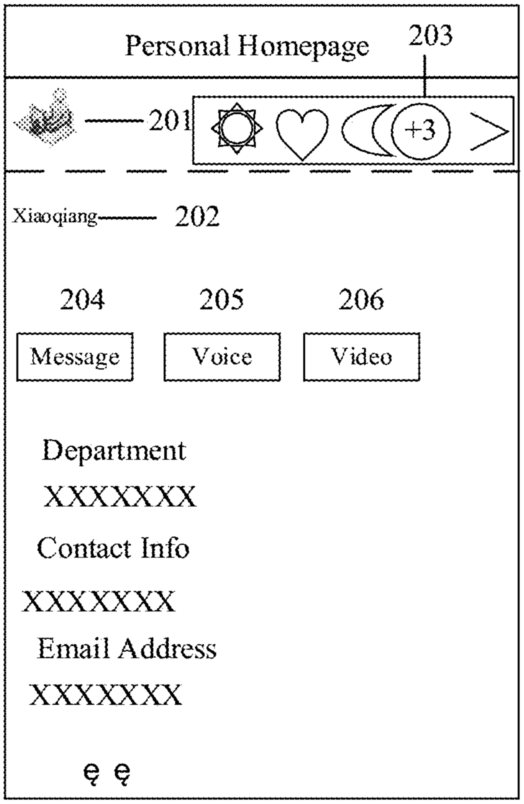
FIG. 2*a* is an effect diagram of a medal display mode provided by an embodiment of the present application.

Referring to FIG. 2*a*, which is a personal homepage of the first user in a specific embodiment of the present disclosure. The personal homepage includes a user avatar 201, a user nickname 202, and a medal wall entrance component 203 on which the icons of 3 medals and the remaining number 3 of medals are displayed. The medal wall of the first user can be entered by triggering the component 203, so as to view all of the medals. In addition, the personal homepage may further include a message sending component 204, a voice component 205, a video component 206 and the basic information of the first user, such as the department, the contact information and the email address. It should be noted that the layout of the personal homepage illustrated in FIG. 2*a* is only illustrated as an example, not as a limitation on the content to be protected in the present application.

Figure 2B:
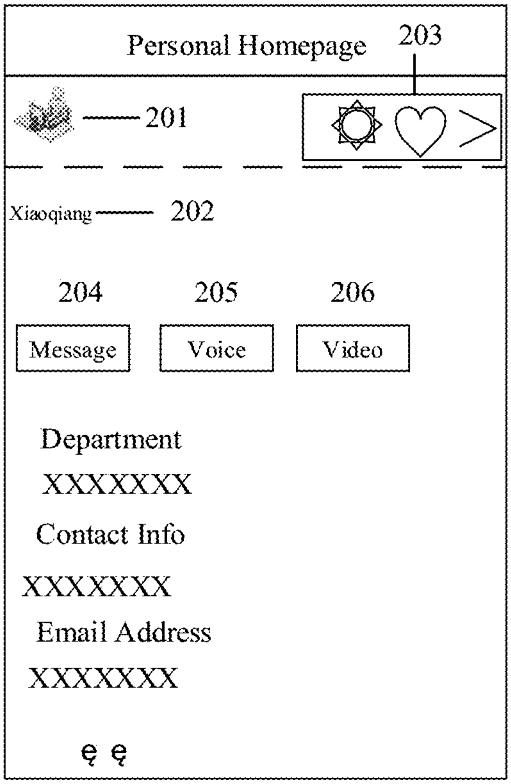
FIG. 2*b* is an effect diagram of another medal display mode provided by an embodiment of the present application.

In a specific implementation, the display mode is determined as the second display mode in response to M being less than or equal to the first preset threshold and greater than 0. The second display mode is used to indicate that the medal information displayed on the personal homepage includes the medal information of the M medals. That is, when the number M of the medals obtained by the first user is less than or equal to the first preset threshold and greater than 0, all of the medals obtained by the first user may be displayed, so that the first user or another user can intuitively view all of the medals obtained by the first user. Specifically, the medal information of the first user may be displayed on the medal wall entrance component of the personal homepage. Referring to FIG. 2*b*, in the case where the first preset threshold is 3 and the first user has obtained 2 medals, then the icons of the 2 medals will be displayed on the medal wall entrance component. The medal wall entrance component is used to enter a medal wall page, in which all of the medals obtained by the first user may be displayed.

Figure 2C:
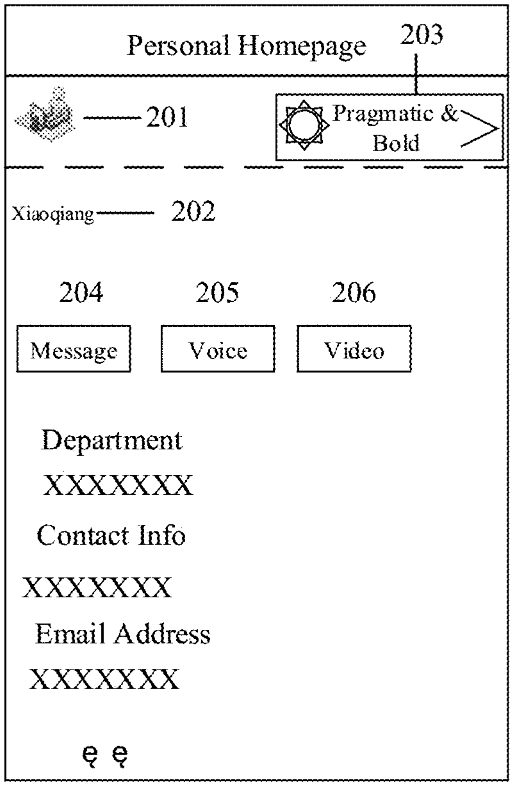
FIG. 2*c* is an effect diagram of yet another medal display mode provided by an embodiment of the present application.

Further, in the case that the number M of medals is less than or equal to the first preset threshold and greater than 0, this embodiment will be divided into the display modes as follows. One kind of display mode is that when the number M of medals is 1, the second display mode is used to indicate that the medal information displayed on the personal homepage includes an icon of the medal and a name of the medal. That is, when the number of medals currently obtained by the first user is 1, the icon of the medal and the name of the medal may be displayed on the medal wall entrance component. For example, as illustrated in FIG. 2*c*, the name of the medal obtained by the first user is "Pragmatic & Bold", and this name and the corresponding medal icon are displayed on the medal entrance component. Another kind of display mode is that when the number M of medals is greater than 1 and less than or equal to the first preset threshold, the second display mode is used to indicate that the medal information displayed on the personal homepage includes icons of M medals. That is, the icons of all of the medals obtained by the first user are displayed on the personal homepage of the first user. Specifically, the icons of the M medals are displayed on the medal entrance component.

Figure 2D:
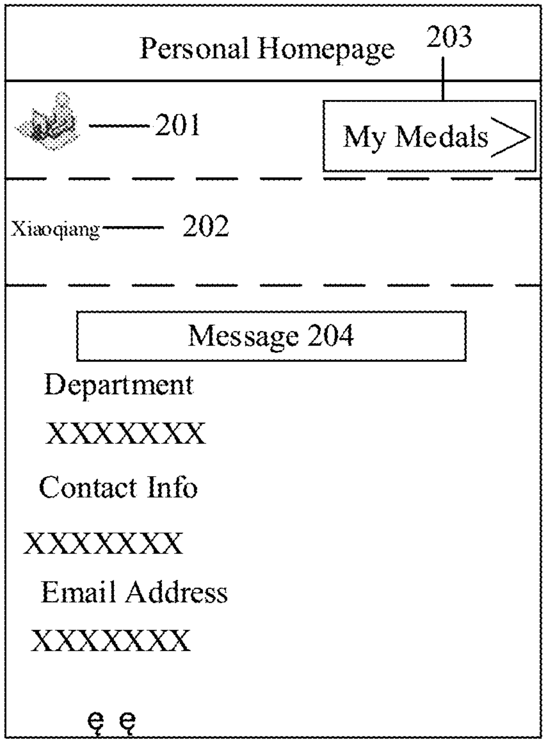
FIG. 2*d* is an effect diagram of yet another medal display mode provided by an embodiment of the present application.

In practical application, there may be cases where no medals are granted to the user. In this case, the display mode is determined as the third display mode in response to M being 0. The third display mode is used to indicate that, when the first user views the personal homepage, the medal information displayed includes preset information, and that, when another user views the personal homepage of the first user, no medal information is displayed on the personal homepage. The preset information may be set according to the actual application situation, which is not limited by this embodiment here. For example, when the number of medals of the first user is 0, when the first user views his/her own personal homepage, no medal icon is displayed on the medal wall entrance component, but only the text of "My Medals" is displayed; or when another user is browsing the personal homepage of the first user, no medal information will be displayed on the personal homepage. For example, as illustrated in FIG. 2*d*, FIG. 2*d* is a schematic diagram of the first user viewing his/her own personal homepage. When the first user views his/her own personal homepage, the content displayed by this personal homepage may be different from the content displayed by another user viewing the personal homepage of the first user.

S103: displaying medal information of the first user on a personal homepage of the first user according to the display mode that is determined.

After the display mode of the medal is determined, the medal information of the first user will be displayed on the personal homepage of the first user according to the display mode, so that the display effect of the medals on the personal homepage is stable, harmonious and aesthetical. Displaying the medal information of the first user on the personal homepage of the first user may include displaying the medal information of the first user on the medal wall entrance component on the personal homepage of the first user.

It can be seen that, a number of medals obtained by the first user is firstly determined when displaying the medals obtained by the first user; then a corresponding display mode is determined according to the number of medals, that is, different display modes are determined according to different numbers of medals; after the display mode is determined, medal information of the first user is displayed on a personal homepage of the first user according to the display mode. It can be seen that, through the scheme provided by the embodiments of the present application, the display mode of medals on the personal homepage can be adjusted according to the number of medals, so that the display effect can be more stable, harmonious, and aesthetical, improving the user experience.

Figure 3A:
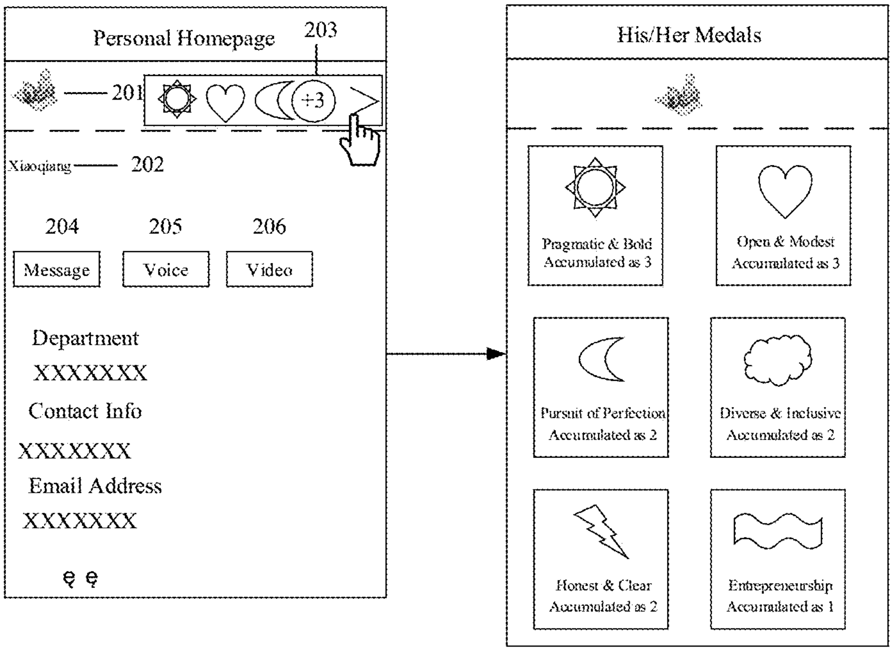
FIG. 3*a* is a display effect diagram of a medal wall page provided by an embodiment of the present application.

In a specific implementation, the first user or another user may enter the medal wall page of the first user through the medal wall entrance component on the personal homepage of the first user, so as to view all of the medals obtained by the first user. Specifically, in response to a triggering operation for the medal wall entrance component, the medal wall page is entered, for displaying the M medals obtained by the first user. For example, as illustrated in FIG. 3*a*, the medal wall page of the first user is entered by triggering the medal wall entrance component 203 on the personal homepage, and the medal wall page may display all of the medals, which are respectively the medal of "Pragmatic & Bold", the medal of "Open & Modest", the medal of "Pursuit of Perfection", the medal of "Diverse & Inclusive", the medal of "Honest & Clear", and the medal of "Entrepreneurship". Meanwhile, the number of medals accumulated by the first user may be further displayed below the corresponding medal.

Figure 3B:
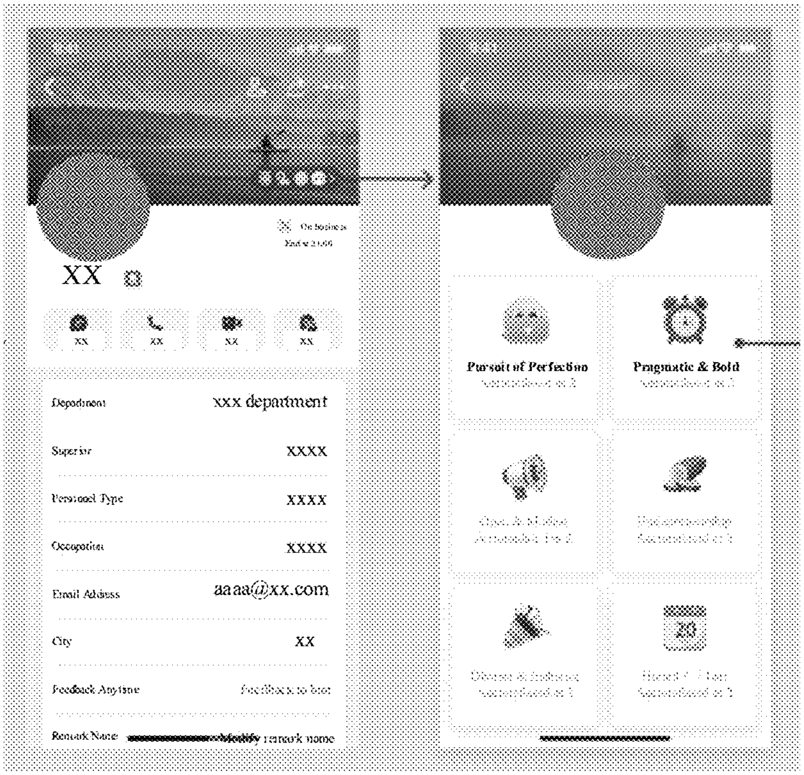
FIG. 3*b* is another display effect diagram of a medal wall page provided by an embodiment of the present application.

In a specific implementation, the avatar of the first user is displayed in the center in response to entering the medal wall page. Further, the background may be blurred. For example, as illustrated in FIG. 3*b*, the user's avatar is displayed in the center, and the background above the avatar is blurred, so that the user can focus more on respective medals in the medal wall page.

Figure 3C:
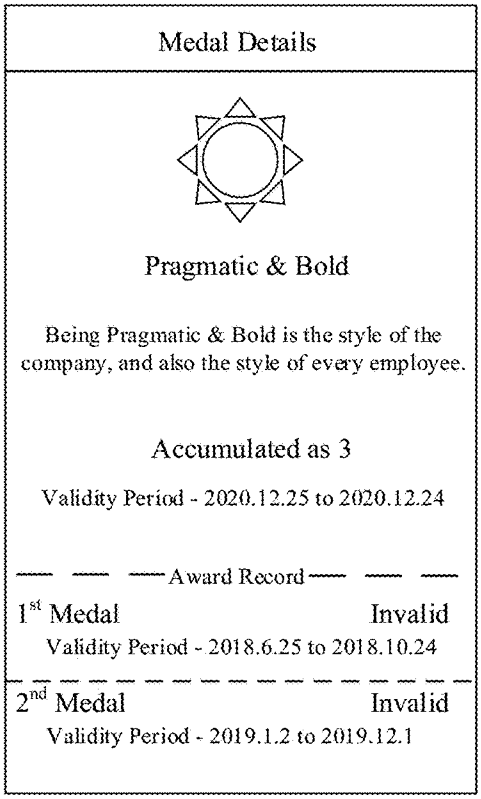
FIG. 3*c* is a display effect diagram of a medal details page provided by an embodiment of the present application.

In a specific implementation, each medal may correspond to a details page. A details page corresponding to any medal on the medal wall page may be entered in response to a triggering operation for the medal. The details page may display the basic information about the medal. For example, an icon of the medal, a name of the medal, a description of the medal and a validity period of the medal may be displayed. Further, historical information may also be included, for indicating a number of times for which the first user has obtained this medal and times at which this medal was obtained each time. The description of the medal is a brief illustration of the medal. For example, as illustrated in FIG. 3*c*, the medal details page of this medal is entered in response to a triggering operation for the medal of "Pragmatic & Bold". In this details page, the description of the medal is "Being Pragmatic & Bold is the style of the company, and also the style of every employee"; the validity period is 2020.12.25-2021.12.24; the number of this medals is accumulated as 3; ant the historical information is that: the first medal's validity period is 2018.6.25-2018.10.24, and the second medal's validity period is 2019.1.2-2019.12.1.

Figure 3D:
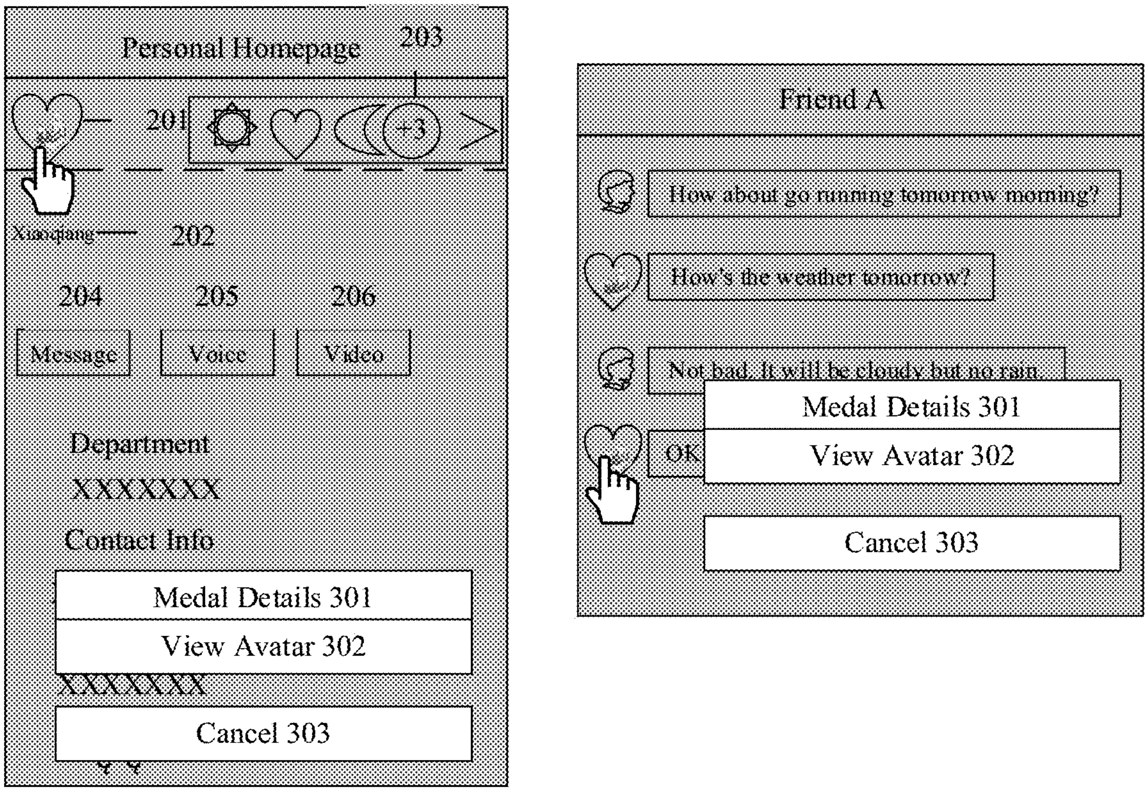
FIG. 3*d* is a schematic diagram for entering a medal details page provided by an embodiment of the present application.

In a specific implementation, a medal details component and an avatar viewing component are displayed in response to the avatar of the first user wearing the first medal and the second user triggering the avatar of the first user. The first medal is any of the medals obtained by the first user. Specifically, in the scenario where the avatar of the first user is displayed, for example, the scenario such as personal homepage, conversation, contacts, documents and the like. After the second user clicks on the avatar of the first user wearing a medal, two options, i.e., the medal details component and the avatar viewing component, are displayed in response to the clicking operation of the second user. The second user may select according to his/her own needs. Further, a cancel component may also be displayed. For example, as illustrated in FIG. 3*d*, the left drawing is a schematic diagram of a display after the second user triggers the avatar wearing the first medal in the personal homepage of the first user, including a medal details component 301, an avatar viewing component 302 and a cancel component 303; and the right drawing is a schematic diagram of a display after the second user triggers the avatar wearing the first medal in the conversation with the first user.

A details page corresponding to the first medal is entered in response to the second user selecting the medal details component, and this details page may include the icon of the first medal, the name of the medal, the description of the medal, the validity period of the medal, the historical information and the like.

From the foregoing, it can be known that this embodiment can enter a medal details page by means of triggering a medal on the medal wall, or can enter a medal details page by means of triggering an avatar wearing a medal.

Figure 3E:
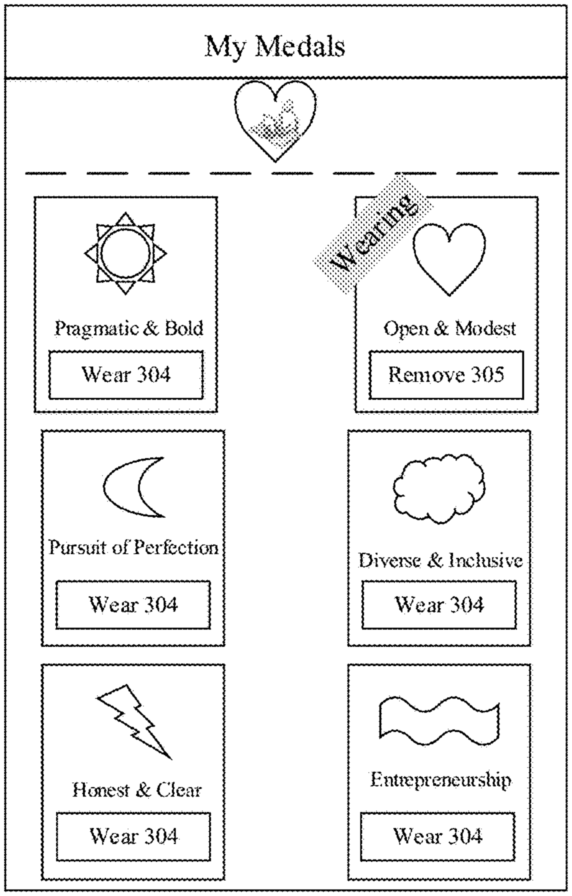
FIG. 3*e* is a schematic diagram for selecting medals to wear provided by an embodiment of the present application.

In a specific implementation, a selected second medal is worn on the avatar of the first user in response to a selecting operation by the first user in a medal wall page corresponding to himself/herself. That is, the first user may select the second medal to wear on the avatar by himself/herself. Specifically, when each medal is displayed on the medal wall, in the case where a certain medal has not been worn on the avatar, the medal will correspond to a wear component, and the first user may wear the medal on the avatar by triggering the wear component; or in the case where a certain medal has been worn on the avatar, the medal will correspond to a remove component, and the first user may remove the medal from the avatar by triggering the remove component. For example, as illustrated in FIG. 3*e*, the first user views his/her own medal wall, on which all of the medals obtained at present are displayed. For the icon of the medal of "Open & Modest" that is worn on the avatar, there is displayed "Wearing" above the icon. Meanwhile, there is displayed a remove component 305 below the icon of the medal. The first user may click on the remove component 305 to remove the medal of "Open & Modest" worn on the avatar. For a medal that is not worn on the avatar, there is displayed a wear component 304 below the medal, and the first user may click on the wear component 304 to wear the medal on the avatar.

Based on the method embodiments described above, the embodiments of the present application provide a medal display device, which will be described below with reference to the accompanying drawings.

Figure 4:
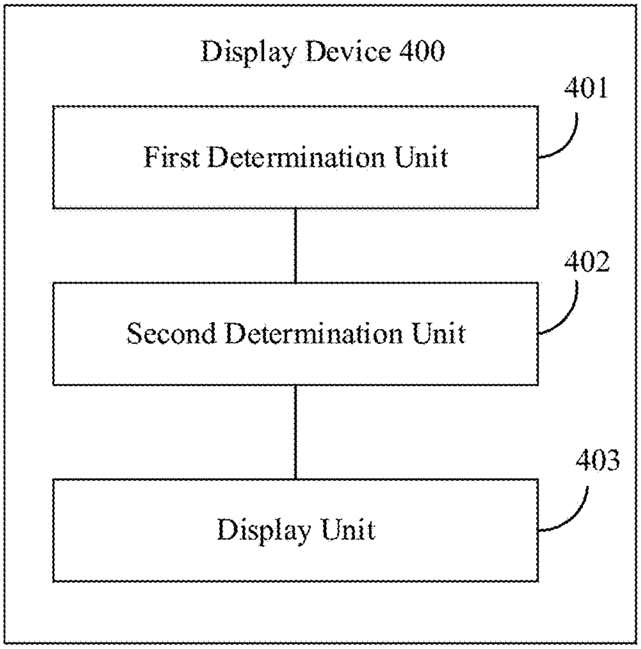
FIG. 4 is a structural diagram of a medal display device provided by an embodiment of the present application.

Referring to FIG. 4, FIG. 4 is a structural diagram of a medal display device provided by an embodiment of the present application. As illustrated in FIG. 4, the device 400 includes the first determination unit 401, the second determination unit 402, and the display unit 403.

The first determination unit 401 is configured to determine a number M of medals granted to the first user;

the second determination unit 402 is configured to determine a display mode according to the number of medals, in which different numbers of medals correspond to different display modes.

The display unit 403 is configured to display medal information of the first user on a personal homepage of the first user according to the display mode that is determined.

In a specific implementation, the second determination unit 402 is specifically used for: determining as the first display mode in response to M being greater than the first preset threshold, the first display mode being used to indicate that the medal information displayed on the personal homepage includes the first preset threshold number of medals and the remaining number, and the remaining number referring to a number obtained by subtracting the first preset threshold from the number M of medals; and/or determining the second display mode in response to M being less than or equal to the first preset threshold and greater than 0, the second display mode being used to indicate that the medal information displayed on the personal homepage includes the M medals; and/or, determined as the third display mode in response to M being 0, the third display mode being used to indicate that, when the first user views his/her own personal homepage, the medal information displayed on the personal homepage includes preset information, and that, when another user views the personal homepage of the first user, no medal information is displayed on the personal homepage.

In a specific implementation, the first preset threshold is greater than or equal to 1, and the second determination unit 402 is specifically used for determining as the second display mode in response to M being 1, in which the second display mode is used to indicate that the medal information displayed on the personal homepage includes the icon of the medal and the name of the medal.

In a specific implementation, the first preset threshold is greater than 1, and the second determination unit 402 is specifically used for determining as the second display mode in response to M being greater than 1 and less than or equal to the first preset threshold, in which the second display mode is used to indicate that the medal information displayed on the personal homepage includes the icons of the M medals.

In a specific implementation, the first preset threshold number of medals is preset by the first user, or the first preset threshold number of medals is the medals that were granted to the first user recently, or the first preset threshold number of medals is the medals corresponding to the first user that are going to expire soon.

In a specific implementation, the displaying medal information of the first user on a personal homepage of the first user includes: displaying the medal information of the first user on the medal wall entrance component on the personal homepage of the first user.

In a specific implementation, the device further includes the first jumping unit;

the first jumping unit is used for entering a medal wall page in response to a triggering operation for the medal wall entrance component, in which the medal wall page is used to display the M medals.

In a specific implementation, the device further includes the second jumping unit;

the second jumping unit is used for entering a details page corresponding to any medal on the medal wall page in response to a triggering operation for the medal, in which the details page is used to display basic information of the medal.

In a specific implementation, the basic information of the medal includes at least one of: an icon of the medal, a name of the medal, a description of the medal and a validity period of the medal.

In a specific implementation, the basic information of the medal further includes historical information which is used to indicate a number of times that the first user has obtained the medal and times at which the medal was obtained each time.

In a specific implementation, the display unit 403 is further used for displaying an avatar of the first user in the center in response to entering the medal wall page.

In a specific implementation, the device further includes a processing unit used for blurring the background in response to entering the medal wall page.

In a specific implementation, the display unit 403 is further used for displaying a medal details component and an avatar viewing component in response to an avatar of the first user wearing the first medal and the second user triggering the avatar of the first user, in which the first medal is any of the medals obtained by the first user.

In a specific implementation, the device further includes the third jumping unit;

the third jump unit is used for entering a details page corresponding to the first medal in response to a triggering operation by the second user for the medal details component.

In a specific implementation, the device further includes a wearing unit;

the wearing unit is used for wearing a selected second medal on the avatar of the first user in response to a selecting operation by the first user in a medal wall page corresponding to himself/herself.

It should be noted that the implementation of the various units in this embodiment can refer to the relevant description in the above method embodiment, which will not be detailed here in this embodiment.

Figure 5:
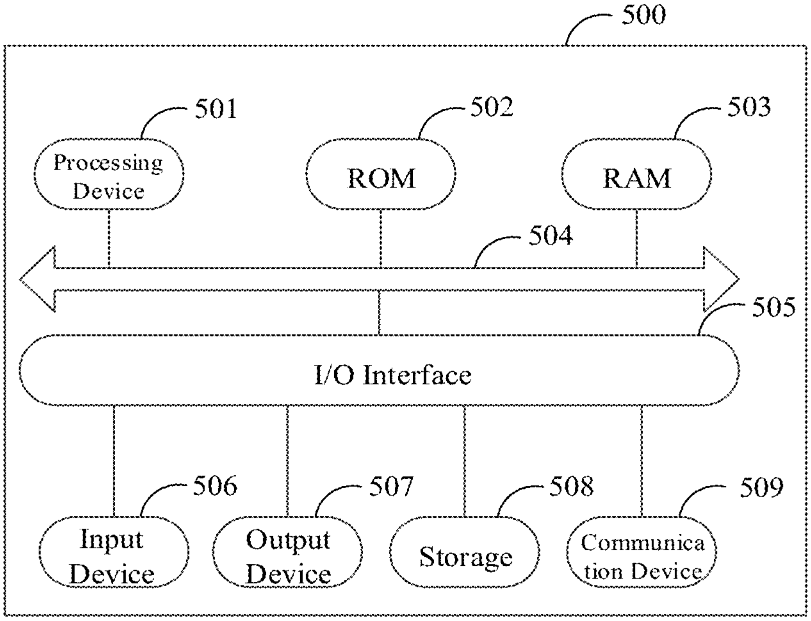
FIG. 5 is a structural diagram of an electronic device provided by an embodiment of the present application.

Referring to FIG. 5, FIG. 5 illustrates a schematic diagram of a structure suitable for implementing an electronic device 500 in the embodiments of the present application. The electronic device 500 in the embodiments of the present application may include, but is not limited to, mobile terminal such as mobile phone, notebook computer, digital broadcast receiver, PDA (Personal Digital Assistant), PAD (Portable Android Device (tablet)), PMP (Portable Media Player), vehicle-mounted terminal (e.g., vehicle navigation terminal), etc., and stationary terminal such as digital TV (television), desktop computer, etc. The electronic device illustrated in FIG. 5 is merely an example, and should not bring any limitation to the functions and application scope of the embodiments of the present application.

As illustrated in FIG. 5, the electronic device 500 may include a processing device (e.g., central processing unit, graphics processor, etc.) 501, which may perform various appropriate actions and processes according to a program stored in a read-only memory (ROM) 502 or a program loaded from a storage 508 into a random access memory (RAM) 503. In the RAM 503, various programs and data required for the operations of the electronic device 500 are also stored. The processing device 501, the ROM 502 and the RAM 503 are connected to each other through a bus 504. An input/output (I/O) interface 505 is also connected to the bus 504.

Generally, the following devices may be connected to the I/O interface 505: an input device 506 including, for example, touch screen, touch pad, keyboard, mouse, camera, microphone, accelerometer, gyroscope, etc.; an output device 507 including, for example, liquid crystal display (LCD), speaker, vibrator, etc.; a storage 508 including, for example, magnetic tape, hard disk, etc.; and a communication device 509. The communication device 509 may allow the electronic device 500 to perform wireless or wired communication with other device to exchange data. Although FIG. 5 illustrates an electronic device 500 with various devices, it should be understood that it is not required to implement or provide all the devices illustrated. Alternatively, more or less devices may be implemented or provided.

In particular, according to an embodiment of the present application, the process described above with reference to the flowchart can be implemented as a computer software program. For example, an embodiment of the present application includes a computer program product comprising a computer program carried on a non-transient computer-readable medium, in which the computer program contains program code for performing the method illustrated in the flowchart. In such an embodiment, the computer program can be downloaded and installed from the network through the communication device 509, or installed from the storage 508 or from the ROM 502. The computer program, when executed by the processing device 501, performs the above functions defined in the methods of the embodiments of the present application.

The electronic device provided by the embodiments of the present application belongs to the same inventive concept as the personal homepage displaying method provided by the above embodiments. The technical details not elaborately described in this embodiment can refer to the above embodiments. Moreover, this embodiment has the same beneficial effects as the above embodiments.

The embodiments of the present application provide a computer-readable medium having stored thereon a computer program, in which the program, when executed by a processor, implements the medal display method as described in any of the above embodiments.

It should be noted that the above computer-readable medium in the present application may be a computer-readable signal medium or a computer-readable storage medium or any combination of both. The computer-readable storage medium may be, for example, but not limited to, an electrical, magnetic, optical, electromagnetic, infrared, or semiconductor system, device or device, or any combination thereof. More specific examples of computer-readable storage media may include, but are not limited to, electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof. In the present application, computer-readable storage medium may be any tangible medium containing or storing a program, which may be used by or in conjunction with an instruction execution system, device or device. In the present application, computer-readable signal medium may include data signals propagated in baseband or as part of a carrier wave, in which computer-readable program code is carried. Such propagated data signal may take many forms, including but not limited to electromagnetic signal, optical signal or any suitable combination thereof. Computer-readable signal medium may also be any computer-readable medium other than a computer-readable storage medium, and the computer-readable signal medium may send, propagate or transmit a program for use by or in conjunction with an instruction execution system, device or device. The program code contained in the computer-readable medium may be transmitted by any appropriate medium, including but not limited to: wire, optical cable, RF (radio frequency) and the like, or any suitable combination thereof.

In some embodiments, a client or server may communicate by utilizing any currently known or future developed network protocol such as HTTP (HyperText Transfer Protocol), and may be interconnected with digital data communication in any form or medium (e.g., communication network). Examples of communication networks include local area network ("LAN"), wide area network ("WAN"), network of network (e.g., Internet) and end-to-end network (e.g., ad hoc end-to-end network), as well as any currently known or future developed network.

The above computer-readable medium may be included in the above electronic device, or may exist separately without being assembled into the electronic device.

The above computer-readable medium carries one or more programs which, when executed by the electronic device, cause the electronic device to perform the above medal display method.

The computer program code for performing the operations of the present application may be written in one or more programming languages or a combination thereof, including but not limited to object-oriented programming language, such as Java, Smalltalk, C++, etc., and conventional procedural programming language, such as "C" language or the like. The program code can be completely executed on a user computer, partially executed on the user computer, executed as an independent software package, partially executed on the user computer and partially executed on a remote computer, or completely executed on a remote computer or server. In the case involving a remote computer, the remote computer may be connected to the user computer through any kind of network, including local area network (LAN) or wide area network (WAN), or may be connected to an external computer (e.g., through the Internet using an Internet service provider).

The flowcharts and block diagrams in the accompanying drawings illustrate architectures, functions and operations of possible implementations of systems, methods and computer program products according to various embodiments of the present application. In this regard, each block in the flowcharts or block diagrams may represent a module, a program segment, or a part of code that contains one or more executable instructions for implementing specified logical functions. It should also be noted that, in some alternative implementations, the functions noted in the blocks may occur in a different order than those noted in the drawings. For example, two blocks illustrated in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, may be implemented by a dedicated hardware-based system that performs specified functions or operations, or by a combination of dedicated hardware and computer instructions.

The involved units described in the embodiments of the present application may be implemented either in software or in hardware. The name of unit/module does not limit the unit itself in some case. For example, a voice data collection module can also be described as a "data collection module".

The functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present application, machine-readable medium may be tangible medium, which may contain or store a program for use by or in conjunction with an instruction execution system, device or apparatus. The machine-readable medium may be machine-readable signal medium or machine-readable storage medium. The machine-readable medium may include, but is not limited to, an electronic, magnetic, optical, electromagnetic, infrared, or semiconductor system, device or apparatus, or any suitable combination thereof. More specific examples of machine-readable storage medium may include electrical connection based on one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof.

It should be noted that various embodiments in this specification is described in a progressive way, and the various embodiments focus on differences from each other, so it is necessary to refer to the same and similar parts among the various embodiments. As for a system or device disclosed in the embodiments, since it corresponds to the method disclosed in the embodiments, the corresponding description is relatively simple, and the related points can refer to the illustration of the method part.

It should be understood that in the present application, "at least one (item)" means one or more, and "multiple" means two or more. The term "and/or", which is used to describe a relationship between associated objects, indicates that there can be three kinds of relationships. For example, "A and/or B" may indicate 3 cases: "only A", "only B", and "both A and B", where A and B may be singular or plural. The character "/" generally indicates an "or" relationship between the front and behind associated objects. The term "at least one (item) of the following" or similar expressions thereof refer to any combination of these items, including any combination of single item(s) or plural item(s). For example, at least one (item) of A, B or C may indicate: "A", "B", "C", "A and B", "A and C", "B and C", or "A and B and C", where A, B and C may be single or plural.

It should also be noted that in this document, the relational terms such as "first" and "second" are merely used to distinguish one entity or operation from another, and do not necessarily require or imply that there is any such actual relationship or order between these entities or operations. Moreover, the terms "include", "comprise" or any other variation thereof are intended to encompass non-exclusive inclusion, so that a process, method, article or device including a series of elements includes not only those elements, but also other elements not explicitly listed or elements inherent to such process, method, article or device. Without further limitations, an element defined by phrase "including a . . . " does not exclude the existence of other identical elements in the process, method, article or device including the said element.

The steps of a method or algorithm described in conjunction with the embodiments disclosed herein may be directly implemented in hardware, a software module executed by a processor, or a combination of both. The software module may be placed in random access memory (RAM), internal memory, read-only memory (ROM), electrically programmable ROM, electrically erasable programmable ROM, register, hard disk, removable disk, CD-ROM, or any other forms of storage medium known in the art.

The foregoing description of the disclosed embodiments enables those skilled in the art to implement or use the present application. Many modifications to these embodiments will be obvious to those skilled in the art, and the general principles defined herein can be implemented in other embodiments without departing from the spirit or scope of the present application. Therefore, the present application will not be limited to the embodiments shown herein, but is to conform to the widest scope consistent with the principles and novel features disclosed herein.

What is claimed is:

1. A medal display method, performed by at least one processor, comprising:

determining a number M of medals granted to a first user;

determining a display mode according to the number of medals, wherein different numbers of medals correspond to different display modes; and displaying medal information of the first user on a medal wall entrance component on a personal homepage of the first user according to the display mode that is determined, wherein the determining a display mode according to the number of medals comprises:

determining as a first display mode in response to M being greater than a first preset threshold, and displaying medal information of the first preset threshold number of medals and a remaining number on the medal wall entrance component on the personal homepage, wherein the remaining number refers to a number obtained by subtracting the first preset threshold from the number M of medals; and the medal display method further comprises:

entering a medal wall page in response to a triggering operation for the medal wall entrance component, wherein the medal wall page is used to display the M medals; and in response to a selecting operation by the first user for a first medal in the medal wall page. wearing the first medal on an avatar of the first user.

2. The medal display method according to claim 1, wherein the determining a display mode according to the number of medals further comprises:

determining as a second display mode in response to M being less than or equal to the first preset threshold and greater than 0, wherein the second display mode is used to indicate that the medal information displayed on the personal homepage comprises the medal information of the M medals; and determining as a third display mode in response to M being 0, wherein the third display mode is used to indicate that, when the first user views his/her own personal homepage, the medal information displayed on the personal homepage comprises preset information, and that, when another user views the personal homepage of the first user, no medal information is displayed on the personal homepage.

3. The medal display method according to claim 2, wherein the first preset threshold is greater than or equal to 1, and the determining as a second display mode in response to M being less than or equal to the first preset threshold and greater than 0 comprises:

determining as the second display mode in response to M being 1, wherein the second display mode is used to indicate that the medal information displayed on the personal homepage comprises an icon of the medal and a name of the medal.

4. The medal display method according to claim 2, wherein the first preset threshold value is greater than 1, and the determining as a second display mode in response to M being less than or equal to the first preset threshold and greater than 0 comprises:

determining as the second display mode in response to M being greater than 1 and less than or equal to the first preset threshold, wherein the second display mode is used to indicate that the medal information displayed on the personal homepage comprises icons of the M medals.

5. The medal display method according to claim 1, wherein the first preset threshold number of medals are preset by the first user, or the first preset threshold number of medals are the medals that have been granted to the first user latest, or the first preset threshold number of medals are the medals corresponding to the first user that are going to expire.

6. The medal display method according to claim 1, further comprising:

entering a details page corresponding to a medal on the medal wall page in response to a triggering operation for the medal, wherein the details page is used to display basic information of the medal.

7. The medal display method according to claim 6, wherein the basic information of the medal comprises at least one of: an icon of the medal, a name of the medal, a description of the medal, and a validity period of the medal.

8. The medal display method according to claim 7, wherein the basic information of the medal further comprises historical information, and the historical information is used to indicate a number of times that the first user has obtained the medal and a time point when the medal was obtained each time.

9. The medal display method according to claim 1, further comprising:

displaying an avatar of the first user in a center in response to entering the medal wall page.

10. The medal display method according to claim 1, further comprising:

blurring a background in response to entering the medal wall page.

11. The medal display method according to claim 1, further comprising:

displaying a medal details component and an avatar viewing component in response to an triggering the avatar of the first user wearing the first medal by a second user.

12. The medal display method according to claim 11, further comprising:

entering a details page corresponding to the first medal in response to a triggering operation by the second user for the medal details component.

13. The medal display method according to claim 1, wherein the M medals refer to medals that are still in a validity period.

14. A computer-readable storage medium storing instructions thereon, which when executed on a device, cause the device to perform the medal display method according to claim 1.

15. A computer program product, wherein the computer program product, when executed on a device, causes the device to perform the medal display method according to claim 1.

16. The medal display method according to claim 1, wherein the first medal in medal wall page is displayed with a remove component, the further comprising:

removing the first medal from the avatar of the first user in response for a selecting operation for the remove component.

17. The medal display method according to claim 1, wherein the first medal is hollow and surrounds the avatar of the first user.

18. A medal display device, comprising:

a first determination unit, configured to determine a number M of medals granted to a first user;

a second determination unit, configured to determine a display mode according to the number of medals, wherein different numbers of medals correspond to different display modes; and a display unit, configured to display medal information of the first user on a medal wall entrance component on a personal homepage of the first user according to the display mode that is determined, wherein the second determination unit is specifically configured to determine as a first display mode in response to M being greater than a first preset threshold, the first display mode is used to indicate that the medal information displayed on the personal homepage comprises medal information of the first preset threshold number of medals and a remaining number, wherein the remaining number refers to a number obtained by subtracting the first preset threshold from the number M of medals; and the medal display device further comprises:

a jumping unit, configured to enter a medal wall page in response to a triggering operation for the medal wall entrance component, wherein the medal wall page is used to display the M medals; and a wearing unit, configured to, in response to a selecting operation by the first user for a first medal in the medal wall page, wear the first medal on an avatar of the first user.

19. An electronic device, comprising:

a memory, used for storing instructions or computer programs; and a processor, used for executing the instructions or computer programs in the memory, to cause the electronic device to perform a medal display method, and the medal display method comprises:

determining a number M of medals granted to a first user;

determining a display mode according to the number of medals, wherein different numbers of medals correspond to different display modes; and displaying medal information of the first user on a medal wall entrance component on a personal homepage of the first user according to the display mode that is determined, wherein the determining a display mode according to the number of medals comprises: determining as a first display mode in response to M being greater than a first preset threshold, and displaying medal information of the first preset threshold number of medals and a remaining number on the medal wall entrance component on the personal homepage, and the remaining number refers to a number obtained by subtracting the first preset threshold from the number M of medals; and the medal display method further comprises:

entering a medal wall page in response to a triggering operation for the medal wall entrance component, wherein the medal wall page is used to display the M medals; and in response to a selecting operation by the first user for a first medal in the medal wall page, wearing the first medal on an avatar of the first user.

* * * * *